US011755059B2

(12) United States Patent
Shiomi

(10) Patent No.: US 11,755,059 B2
(45) Date of Patent: Sep. 12, 2023

(54) SYSTEM FOR SETTING AN OPERATING CLOCK OF A CPU OF A VEHICULAR DEVICE

(71) Applicant: DENSO CORPORATION, Kariya (JP)

(72) Inventor: Tsuyoshi Shiomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 17/398,352

(22) Filed: Aug. 10, 2021

(65) Prior Publication Data
US 2021/0373590 A1 Dec. 2, 2021

Related U.S. Application Data

(63) Continuation of application No. PCT/JP2020/006058, filed on Feb. 17, 2020.

(30) Foreign Application Priority Data

Mar. 13, 2019 (JP) .................. 2019-045892

(51) Int. Cl.
G06F 1/28 (2006.01)
G06F 1/08 (2006.01)
B60R 16/023 (2006.01)

(52) U.S. Cl.
CPC .............. G06F 1/08 (2013.01); B60R 16/023 (2013.01)

(58) Field of Classification Search
CPC ................... G06F 1/08; B60R 16/023
See application file for complete search history.

(56) References Cited

U.S. PATENT DOCUMENTS

| 6,681,336 | B1* | 1/2004 | Nakazato | G06F 1/329 713/1 |
| 11,443,111 | B2* | 9/2022 | Aoyagi | G06F 1/08 |
| 2005/0050310 | A1 | 3/2005 | Bailey et al. | |
| 2005/0204181 | A1* | 9/2005 | Montero | G06F 9/4406 714/4.2 |
| 2006/0117199 | A1 | 6/2006 | Bailey et al. | |
| 2006/0117200 | A1 | 6/2006 | Bailey et al. | |
| 2006/0123263 | A1 | 6/2006 | Bailey et al. | |
| 2006/0123264 | A1 | 6/2006 | Bailey et al. | |
| 2006/0259838 | A1* | 11/2006 | Nardini | G01R 31/318575 714/726 |
| 2007/0198872 | A1 | 8/2007 | Bailey et al. | |
| 2010/0049960 | A1 | 2/2010 | Okamoto et al. | |
| 2010/0315146 | A1* | 12/2010 | Yen | G06F 1/08 327/291 |

(Continued)

FOREIGN PATENT DOCUMENTS

CN 107256150 A 10/2017
JP 2000-148475 A 5/2000

(Continued)

Primary Examiner — Zahid Choudhury
(74) Attorney, Agent, or Firm — Harness, Dickey & Pierce, P.L.C.

(57) ABSTRACT

A vehicular device includes a CPU. The CPU is set in a rated state in which the CPU operates at a rated operating clock and a high speed state in which the CPU operates at an operating clock higher than the rated operating clock. The high speed state is changeable in the operating clock and the rated state is not changeable in the rated operating clock.

13 Claims, 6 Drawing Sheets

(56) References Cited

U.S. PATENT DOCUMENTS

| | | | |
|---|---|---|---|
| 2013/0114203 A1* | 5/2013 | Ignatchenko | G06F 1/206 |
| | | | 361/679.41 |
| 2014/0068282 A1* | 3/2014 | Jenne | G06F 1/3234 |
| | | | 713/300 |
| 2021/0016728 A1* | 1/2021 | Mukherjee | G06F 1/3293 |

FOREIGN PATENT DOCUMENTS

| | | |
|---|---|---|
| JP | 2001005661 A | 1/2001 |
| JP | 2001-117663 A | 4/2001 |
| JP | 2004266661 A | 9/2004 |
| JP | 2007535721 A | 12/2007 |
| JP | 2008-198072 A | 8/2008 |
| JP | 2008186175 A | 8/2008 |
| JP | 2010-039543 A | 2/2010 |
| JP | 2015-054649 A | 3/2015 |

* cited by examiner

SYSTEM FOR SETTING AN OPERATING CLOCK OF A CPU OF A VEHICULAR DEVICE

CROSS REFERENCE TO RELATED APPLICATIONS

The present application is a continuation application of International Patent Application No. PCT/JP2020/006058 filed on Feb. 17, 2020, which designated the U.S. and claims the benefit of priority from Japanese Patent Application No. 2019-045892 filed on Mar. 13, 2019. The entire disclosures of all of the above applications are incorporated herein by reference.

TECHNICAL FIELD

The present disclosure relates to a vehicular device.

BACKGROUND

Generally, in a computer system, it is considered that high performance can be realized by increasing an operating clock of a CPU. At this time, for example, by using a CPU whose operating clock fluctuates according to load, it is possible to temporarily improve processing capacity as needed. Thus, it is possible to achieve overall high performance while balancing power consumption and processing capacity. Hereinafter, the CPU whose operating clock fluctuates during operation will be referred to as a variable CPU for convenience.

SUMMARY

The present disclosure provides a vehicular device includes a CPU. The CPU is set in a rated state in which the CPU operates at a rated operating clock and a high speed state in which the CPU operates at an operating clock higher than the rated operating clock. The high speed state is changeable in the operating clock and the rated state is not changeable in the rated operating clock.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
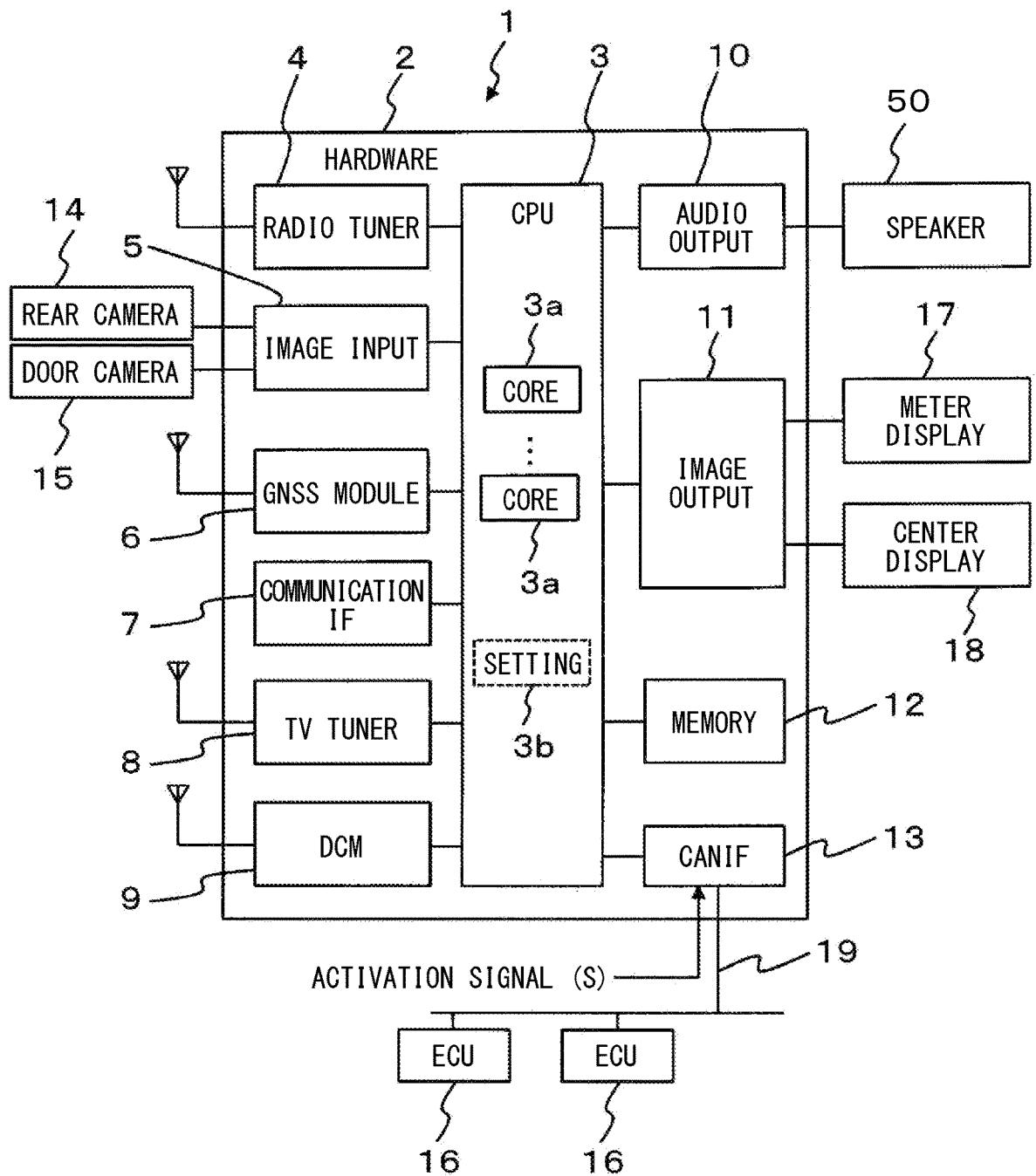
FIG. 1 is a diagram schematically showing an electrical configuration example of a vehicular device according to a first embodiment.

It is considered that a vehicular device is one of computer systems controlled by a CPU. In the vehicle device, unlike a general-purpose computer system such as a personal computer, there is difficulty as follows when a variable CPU is employed.

That is, a vehicle is provided with noise sensitive functional units such as a radio tuner, a GNSS module, Wifi, Bluetooth (registered trademark), and the like. Further, the vehicle is provided with multiple vehicular devices. Therefore, in order to inhibit noise from affecting the functional unit and other vehicular devices, each vehicular device is required to have a strict noise design.

If a variable CPU is employed, the operating clock fluctuates during operation, a noise component also fluctuates accordingly. Therefore, it is necessary to design noise for all possible operating clocks of the variable CPU. However, considering man hours and costs of verification, it is practically difficult to perform an ideal noise design assuming all operating clocks. If such an ideal noise design is not performed, there is a risk of causing deterioration of voice, misalignment of the vehicle, communication error with other vehicle devices, and the like.

The present disclosure provides a vehicular device capable of achieving high performance without being affected by noise.

An exemplary embodiment of the present disclosure provides a vehicular device that includes a CPU and a setting unit. The CPU is set in a rated state in which the CPU operates at a rated operating clock and a high speed state in which the CPU operates at an operating clock higher than the rated operating clock. The setting unit sets the CPU to the rated state or the high speed state. The setting unit sets the CPU to the high speed state in a predetermined period from an activation, and sets the CPU to the rated state after the predetermined period elapses.

In the exemplary embodiment of the present disclosure, since it is considered that the functional unit and other vehicular devices are also activated at the time of activation, it is possible to realize high performance of the vehicular device without being affected by noise. Further, since the operating clock does not fluctuate when the rated state is set, it is possible to inhibit noise from affecting other functional units, peripheral circuits, or other devices.

Embodiments are described below with reference to the drawings. Further, the configurations that are substantially common in each embodiment will be described with the same reference numerals.

First Embodiment

A first embodiment will be described with reference to FIGS. 1 to 4. First, an electrical configuration of a vehicular device 1 will be described with reference to FIG. 1.

Figure 2:
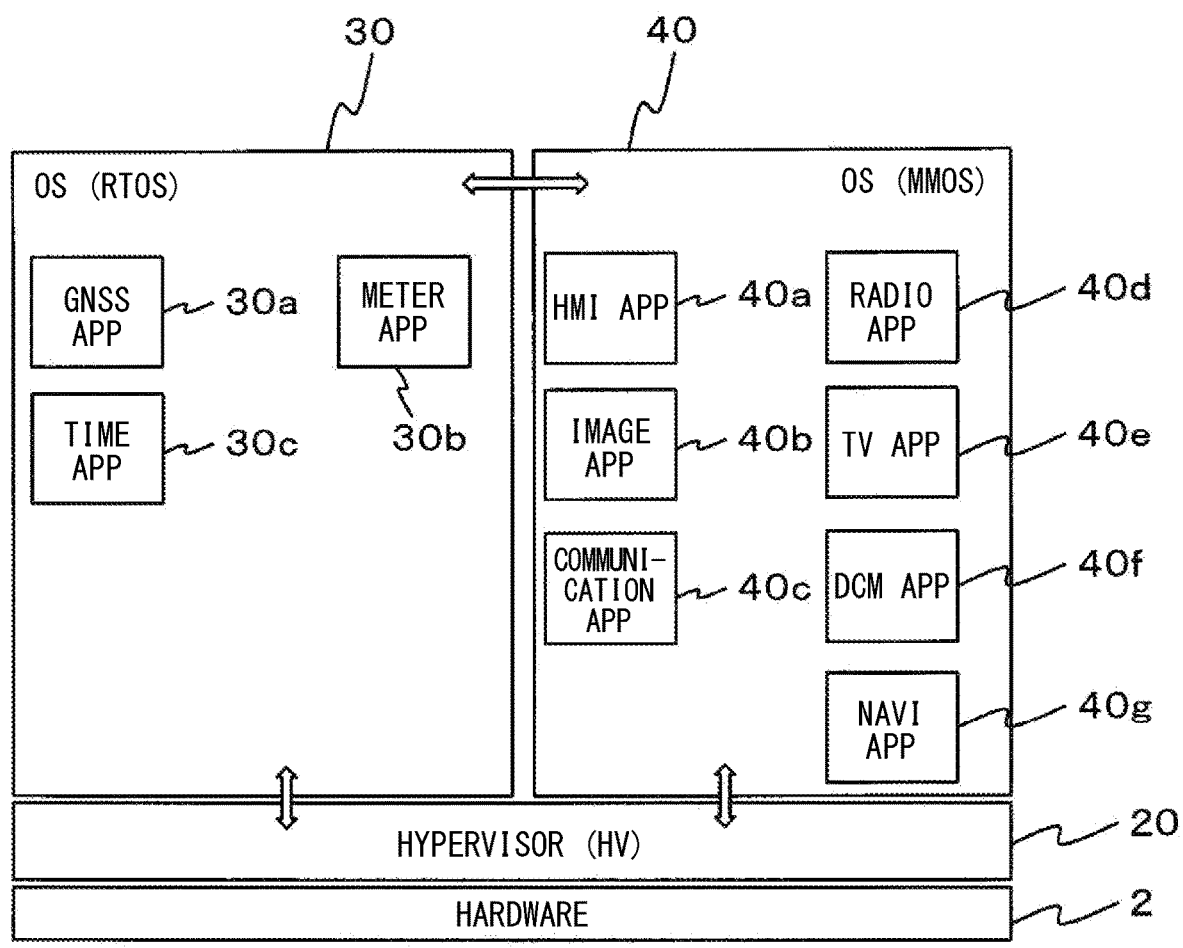
FIG. 2 is a diagram schematically showing a software configuration of the vehicular device.

As shown in FIG. 1, the vehicular device 1 of the present embodiment is provided with one CPU 3 on one hardware 2. The CPU 3 has multiple built-in cores $3a$, and in the present embodiment, eight cores $3a$ are built-in. As shown in FIG. 2, which will be described later, each core $3a$ is appropriately assigned to operating systems 30 and 40 operating on the CPU 3. The number of cores $3a$ is an example and is not limited thereto.

The CPU 3 is capable of setting a rated state that operates at a rated operating clock and a high speed state that operates at a higher clock than the rated operating clock. The CPU 3 is provided with a setting unit 3b realized by software. The setting unit 3b sets the CPU 3 to the rated state or the high speed state.

When the CPU 3 is set to the rated state, the CPU 3 operates only at the rated operating clock. On the other hand, when the CPU 3 is set to the high speed state, the CPU 3 operates with the operating clock changing, according to the load, between the rated operating clock and a maximum allowable clock. At this time, the CPU 3 automatically changes the operating clock according to the load.

Even in the high speed state, the operation may be performed at the rated operating clock depending on the load, so the high speed state does not necessarily change the operating clock. Further, in the present embodiment, the operating clock sets multiple stages between the rated clock and the maximum clock in advance. The CPU 3 selects one of the stages of the operating clock according to the load. Alternatively, the CPU 3 is capable of selecting an arbitrary one of the stages of the operating clock which is operable between the rated clock and the maximum clock.

Further, on the hardware 2, a radio tuner 4, a video input unit 5, a Global Navigation Satellite System module 6 (hereinafter, GNSS module 6), a communication interface 7 (hereinafter, communication IF 7), a TV tuner 8, a Data Communication Module 9 (hereinafter, DCM 9), an audio output unit 10, a video output unit 11, a storage unit 12, a Controller Area Network interface 13 (hereinafter, CANIF 13) and the like are provided.

However, the vehicular device 1 does not necessarily include all the configurations shown in FIG. 1, and may have necessary configurations. Hereinafter, these configurations are also referred to as peripheral circuits for convenience. Further, these peripheral circuits constitute a functional unit controlled by the CPU 3.

The radio tuner 4 enables viewing of radio broadcasting by receiving radio waves transmitted from a broadcasting station with an antenna.

The video input unit 5 inputs an image taken by a rear camera 14 provided at the rear of the vehicle and photographing the rear, and a door camera 15 provided at a door of the vehicle and photographing the sides and the rear. The video input unit 5 performs processing such as converting the input image into a format capable of being processed by the CPU 3 or the like. The number and functions of the cameras are merely an example, and the present disclosure is not limited thereto. Alternatively, a configuration in which a camera substituting a so-called rearview mirror is provided or a configuration in which the door camera 15 is not provided may be used.

The GNSS module 6 receives a signal from the artificial satellite of a global positioning satellite system. This GNSS module 6 has a specification corresponding to the target system among various systems such as Global Positioning System, Global Navigation Satellite System, Galileo, Quasi-Zenith Satellite System, and BeiDou Navigation Satellite System.

The communication IF 7 is an interface such as USB, Bluetooth, or Wifi for exchanging data with a storage medium or an external device. The TV tuner 8 enables the user to watch a TV program by receiving radio waves transmitted from a broadcasting station with an antenna.

The DCM 9 is a data communication device for the vehicle, and communicates with a center provided outside the vehicle or with another Electronic Control Unit 16 (hereinafter, ECU 16) provided in the vehicle. Although the vehicular device 1 can be considered as one of the ECUs 16, the vehicular device 1 and the ECU 16 are distinguished here for the sake of simplification of the description.

The DCM 9, for example, transmits vehicle information collected from the ECU 16 to an external center via a network and receives information from the center and notifies the user. When an accident occurred, the DCM 9 automatically connects to the center and notifies the center of the location and time of the accident.

The audio output unit 10 outputs audio from a radio broadcast, a television broadcast, a navigation function, or the like to a speaker 50.

The video output unit 11 displays an image captured by the rear camera 14 and the door camera 15, a television broadcast image, an image read from an external medium, and the like. The video output unit 11 also displays an operating state of the vehicular device 1 and acquired vehicle information.

In the present embodiment, the vehicular device 1 displays, for example, a speedometer, a warning light, or the like in full graphic. Then, the image of the speedometer and the image of the warning lamp output from the video output unit 11 are displayed on the meter display 17 as a display unit arranged in front of the driver's seat, for example. Further, the navigation screen is displayed on the center display 18 as a display unit arranged near the center of the vehicle, for example. The number and arrangement of display units are an example, and are not limited thereto.

The storage unit 12 is composed of, for example, a semiconductor memory, and stores various data and programs necessary for the operation of the vehicular device 1. Although the details will be described later, when the vehicular device 1 is activated, the boot loader is read from the storage unit 12 and executed, and at that time, the state of the CPU 3 is set. That is, the boot loader stored in the storage unit 12 is executed by the CPU 3, so that the setting unit 3b is realized by software.

The CAN IF 13 is an interface for exchanging data with various ECUs 16 via a CAN bus 19. The CAN IF 13 operates even when the CPU 3 is not activated, and activates the CPU 3 when an activation signal (S) is input via the CAN bus 19. Since the CAN bus 19 is originally designed for vehicles and has high noise resistance, the CAN bus 19 is excluded from functional units and peripheral circuits affected by noise in the present embodiment.

When the ECU 16 detects unlocking operation from a remote control key, opening the door, turning on an accessory switch, turning on an ignition switch, turning on a power switch, and the like, the activation signal (S) is transmitted from the ECU 16 to the vehicular device 1. Factors for transmitting the activation signal (S) are not limited thereto.

Next, software configuration of the vehicular device 1 will be described with reference to FIG. 2. As shown in FIG. 2, in the vehicular device 1, a hypervisor 20 operates on the hardware 2, that is, on the CPU 3. The hypervisor 20 is software for constructing a virtual environment, and well-known software can be adopted. Therefore, a detailed description of the hypervisor 20 will be omitted here. The hypervisor 20 may be implemented as a part of the function of an OS, for example. Hereinafter, the hypervisor 20 is also referred to as an HV for convenience.

On the hypervisor 20, an operating system 30 (hereinafter, OS 30) and operating system 40 (hereinafter, OS 40) are operated. The OS 30 is a so-called Real Time OS, and a function mainly required for real time performance is realized by executing various programs.

Hereinafter, various programs executed on the OS 30 and the OS 40 are collectively referred to as applications for convenience. Further, an individual application is also referred to as a video application 40*b* or the like, as will be described later.

In the OS 30, a GNSS application 30*a* for acquiring the current position and time from the information received by the GNSS module 6, a meter application 30*b* for displaying the image of the speed meter on the meter display 17, and a time application 30*c* for displaying the time on the center display 18, and the like are executed. Then, each functional unit is realized by each application and the peripheral circuit corresponding to each application. The number and types of applications is an example, and the number and types of applications are not limited thereto. Hereinafter, the OS 30 is also referred to as a Real Time OS (hereinafter, RTOS) for convenience.

The OS 40 realizes a function that does not require real time performance as compared with the OS 30 and a so-called multimedia function. The OS 40 provides a so-called in-vehicle infotainment function that provides information and entertainment. Hereinafter, the OS 40 is also referred to as Multi Media OS (hereinafter, MMOS) for convenience.

In the OS 40, an HMI application 40*a*, a video application 40*b*, a communication application 40*c*, a radio application 40*d*, a TV application 40*e*, a DCM application 40*f*, and a navigation function 40*g* and the like are executed. The HMI application 40*a* provides a human machine interface (hereinafter, HMI). The video application 40*b* displays a video input to the video input unit 5. The communication application 40*c* communicates with storage medium or an external device via the communication IF 7. The radio application 40*d* is for watching radio broadcast received by the radio tuner 4. The TV application 40*e* is for watching TV broadcast received by the TV tuner 8. The DCM application 40*f* controls the DCM9. The navigation function 40*g* provides a navigation function. Then, each functional unit is realized by each application and the peripheral circuit corresponding to each application. The number and types of applications is an example, and the number and types of applications are not limited thereto.

Each two of the hypervisor 20, the OS 30, and the OS40 are communicable by a predetermined protocol. Further, the access from the OS 30 or the OS 40 to the hardware 2 is basically performed via the hypervisor 20.

Next, the effects of the configuration described above will be explained. As described above, in a general computer system, it is considered that high performance can be realized by increasing the operating clock. At this time, when the operating clock is simply increased, over specification may occur. Therefore, when a variable CPU capable of changing the operating clock during operation is used, it is thought that high performance can be achieved while the overall power consumption and processing capacity are balanced.

However, the vehicular device 1 is provided with relatively noise sensitive functional units such as the radio tuner 4, the GNSS module 6, and the communication IF7 such as Wifi and Bluetooth as described above. The vehicular device 1 is required to have a strict noise design so as not to affect them. This is because if noise generated during the operation of the CPU 3 affects the functional unit, it may cause a malfunction such as deterioration of voice, misalignment of the vehicle, a communication error with another vehicular device 1, or deterioration of the performance of the functional unit.

However, in the variable CPU, when the operating clock fluctuates during operation, a noise component also fluctuates accordingly. Considering the man hours and costs of verification, it is practically difficult to design noise for all the operating clocks that the variable CPU can take.

Therefore, in the past, noise design can be easily performed by not changing the operating clock. This is because in the case of the vehicular device 1, the OS and applications to be executed can be assumed to some extent, so that the CPU 3 having sufficient performance for their operation is adopted in advance. This is also due to the property of the vehicular device 1 that the situation in which the operating clock is fluctuated during operation is less likely to occur as compared with a general-purpose computer system such as a so-called personal computer.

In other words, in the case of the vehicular device 1, there is not much merit of using the variable CPU, and conversely, there is a demerit that noise design becomes difficult by using the variable CPU.

On the other hand, the vehicular device 1 displays a speedometer image, a warning lamp, and the like as described above. Since these displays are information that is required not only during traveling but also when starting traveling, it is necessary to display them promptly. In addition, for example, there are laws and regulations such as the Kid's Transportation Law (hereinafter referred to as the KT Law) in the United States of America, which stipulate rear visibility requirements including the time until the image of the rear camera 14 is displayed.

Therefore, there is a strong demand for higher performance of the vehicular device 1. However, as described above, it is an essential condition that the functional unit and the ECU 16 are not affected. Therefore, in the present embodiment, the performance of the vehicular device 1 is improved without affecting the functional unit and the ECU 16 as follows. Here, the improvement of the vehicular device 1 indicates that time from the activation of the vehicular device 1 to the vehicular device 1 capable of operating is shortened. Note that affection of noise not given does not mean that noise is not generated at all, but that noise design can be used as a countermeasure.

First, flow of processing at activation will be described with reference to FIG. 3. Although the state of the CPU 3 is set by the setting unit 3*b*, the vehicular device 1 will be mainly described below for simplification of the description.

Figure 3:
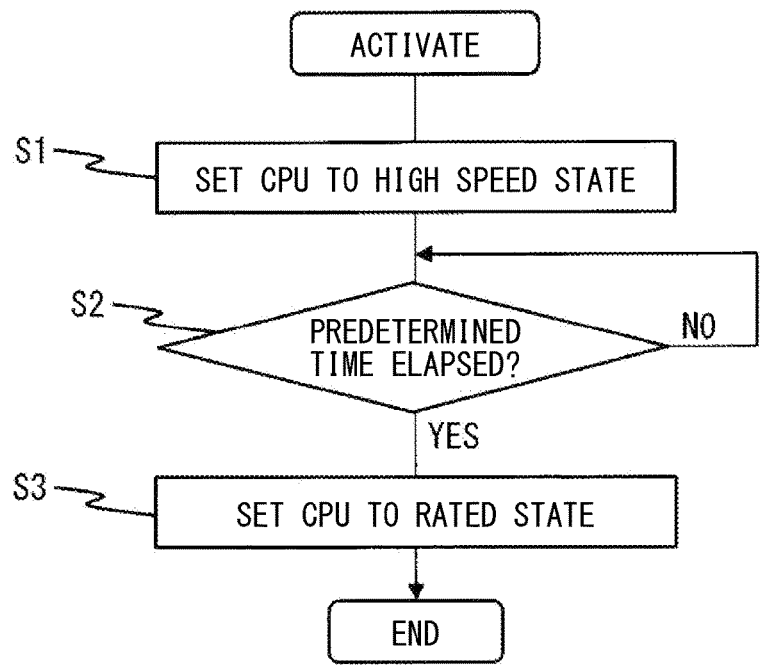
FIG. 3 is a diagram showing a flowchart of activation processing.

In the activation processing shown in FIG. 3, when the vehicular device 1 is activated by inputting the activation signal (S), the vehicular device 1 sets the CPU 3 to the high speed state in S1. This setting is performed when the boot loader read from the storage unit 12 is executed. That is, the CPU 3 quickly shifts to the high speed state after the activation.

Subsequently, the vehicular device 1 determines in S2 whether a predetermined period has elapsed from the activation. This predetermined period will be described later. Then, when the vehicular device 1 determines that the predetermined period has not elapsed, S2 becomes NO and the vehicular device 1 waits without changing the setting of the CPU 3. Here, the setting change of the CPU 3 is awaited, and the activation processing itself is executed by the CPU 3 in the high speed state.

On the other hand, when the vehicular device 1 determines that the predetermined period has elapsed, S2 becomes YES, and the CPU 3 is set to the rated state in S3.

Then, the vehicular device 1 terminates the setting processing of the CPU 3. That is, at the time of activation, the vehicular device 1 sets the CPU 3 to the high speed state within a predetermined period from the activation, and sets the CPU 3 to the rated state after the predetermined period elapses.

Next, the details of the above-mentioned predetermined period will be described. As shown in a sequence chart with the horizontal axis as the time axis in FIG. 4, the state of the vehicular device 1 changes when activated. When the vehicular device 1 is activated, the OS is started up and then the peripheral circuits are initialized. Thereafter, the functions that require high speed start-up are prioritized, and the functions that do not require high speed startup are also executed. The OS startup, peripheral circuit initialization, and execution of each function may be partially duplicated.

Here, the function that requires high speed startup may include a function required during traveling or a function that provides information to be notified before starting traveling. In the present embodiment, the function that requires high speed startup corresponds to the display of an image taken by the door camera 15 and the rear camera 14, the display of a speedometer image, the display of a warning lamp image, and the like. These functions that require high speed startup are executed at any time when the initialization of the corresponding peripheral circuit is completed. Further, from the viewpoint of user convenience, although not shown, a defrost function and an air conditioner function can be considered as functions that require high speed startup.

On the other hand, the function that does not require high speed startup includes a function other than the function that requires high speed startup, and in the present embodiment, corresponds to viewing of radio broadcasting or television broadcasting. In addition, the function that does not require high speed startup includes a function that are not automatically executed at the activation and a function that are started by a user operation.

In this way, when the vehicular device 1 is activated, it is necessary to start up the OS and execute various initialization processes, and it is expected that the load will be larger than the so-called normal state after the initialization is completed. Therefore, in order to realize high performance of the vehicular device 1, the priority of shortening the startup time is high.

In addition, although it is necessary to quickly execute some functions, that is, functions that require high speed startup immediately after activation, it is often sufficient to execute functions that do not require high speed startup after a certain period of time has elapsed. Further, it is considered that the other ECU 16 is also being activated at the time point when the vehicular device 1 is activated.

Therefore, paying attention to these points, when the vehicular device 1 is activated, the CPU 3 is set to the high speed state in which the CPU 3 operates with a high speed operating clock. The configuration can improve the processing capacity at the time of activation and shorten the activation time of the vehicular device 1. That is, the configuration can both realize high performance and inhibit the affection of the noise caused by the fluctuation of the operating clock.

In the present embodiment, as a state in which noise does not affect, not only a state in which noise does not literally affect the peripheral circuits of functional units, but also a state in which noise does affect the performance and reliability of vehicle equipment even though the noise affects the peripheral circuits of functional units.

For example, even if the radio tuner 4 is affected by noise and the sound quality is deteriorated, it can be considered that the influence of noise is not exerted unless the sound is output. Alternatively, even if the GNSS module 6 is affected by noise and the current position cannot be specified, it can be considered that the noise does not affect the GNSS module 6 unless the current position of the vehicle is displayed.

It is considered that the period during the high speed state in which the processing capacity is improved becomes long with an increase of the period during which it can be considered that the influence of noise is not exerted. Thus, it is considered that the performance of the vehicular device 1 can be improved.

Figure 4:
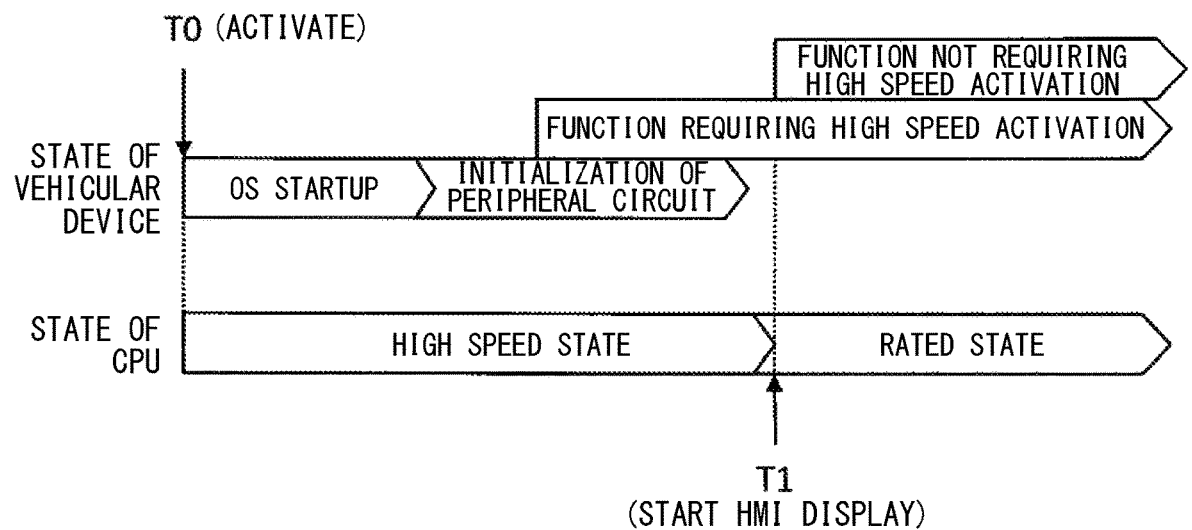
FIG. 4 is a diagram showing a state of a vehicular device and a CPU in comparison with each other.

Therefore, when the vehicular device 1 is activated at the time point T0 shown in FIG. 4, the CPU 3 is set to the high speed state in the period until the display of the HMI is started at the time point T1. That is, the vehicular device 1 sets the CPU 3 to the high speed state until the provision of visual or audible information to the user is started.

As a result, the high speed state can be maintained for a longer period of time, and the activation time can be further shortened. The HMI is an application that runs on the CPU 3, and constitutes a functional unit controlled by the CPU 3. Therefore, the period from the start of the display of the HMI corresponds to the period from the activation to the execution of a specific application running on the CPU 3 or the period from the activation to the start of the operation of a specific functional unit. Note that a specific functional unit may be considered to be sensitive to noise.

After that, the vehicular device 1 sets the CPU 3 to the rated state. As a result, since the CPU 3 operates at the rated clock after that, the influence of noise due to the fluctuation of the operating clock is eliminated.

According to the vehicular device 1 described above, the following effects can be achieved.

The vehicular device 1 includes the CPU 3 and setting unit 3b. The CPU 3 is configured to set the rated state that operates at the rated operating clock and the high speed state that operates at the speed higher than the speed of the rated operating clock. The setting unit 3b sets the CPU 3 to the rated state or the high speed state. The setting unit 3b sets the CPU 3 to the high speed state within a predetermined period from the activation, and sets the CPU 3 to the rated state after the predetermined period elapses.

According to such a configuration, the processing capacity of the CPU 3 at the time of activation, which is considered to have a relatively high load, can be improved and the performance of the vehicular device 1 can be improved. Further, since it is considered that each functional unit and the other vehicular device 1 are also being activated at the time of activation, the configuration can inhibit malfunction and performance deterioration due to noise.

Therefore, high performance can be realized without being affected by noise. In other words, by operating a function with high noise immunity in the high speed state, the configuration can eliminate the influence of noise on malfunction and performance deterioration.

In addition, since the performance can be improved without changing the noise design and evaluation man hours, the configuration can achieve both high performance and reliability. Further, when the vehicular device 1 is activated quickly, for example, the screen display is started immediately after the user gets on the vehicle. Thus, the configuration can appeal that the vehicle has high performance in a form that is easy for the user to understand.

Further, the vehicular device 1 sets the CPU 3 to the high speed state during the period from the activation to the start of providing the human machine interface. That is, the vehicular device 1 sets the CPU 3 to the high speed state in the period from the activation to the execution of the HMI, which is a specific application running on the CPU 3. Furthermore, the vehicular device 1 sets the CPU 3 to the high speed state in the period from the activation to the start of the operation of the HMI, which is a specific functional unit.

As a result, a predetermined period is defined as a period during which the noise does not directly affect the performance and reliability of the vehicular device even if there is a substantial influence of noise, and the configuration can set the CPU 3 to the high speed state during the predetermined period. Therefore, the configuration can maintain the high speed state for a longer period of time, and fasten the processing at the time of activation, that is, further shorten the activation time.

In the present embodiment, the HMI application 40*a* is exemplified as a specific application and the HMI is exemplified as a specific functional unit, but other applications and functional units may be provided as a specific application or a specific functional unit.

Second Embodiment

A second embodiment will be described with reference to FIG. 5. In the second embodiment, an example of a predetermined period different from that of the first embodiment will be described. Since the configuration of the vehicular device 1 is the same as that of the first embodiment, it will be described with reference to FIGS. 1 and 2.

In the second embodiment, the vehicular device 1 sets the CPU 3 to the high speed state in a predetermined period from the activation to the start of the OS running on the CPU 3. At this time, the hypervisor 20, the OS 30, and the OS 40 operate on the vehicular device 1 as shown in FIG. 2. As shown in FIG. 5, the hypervisor 20, the OS 30, and the OS 40 are configured such that when the OS is started up, the hypervisor 20 is started up first, then the OS 30 is started up, and finally the OS40 is started up.

Figure 5:
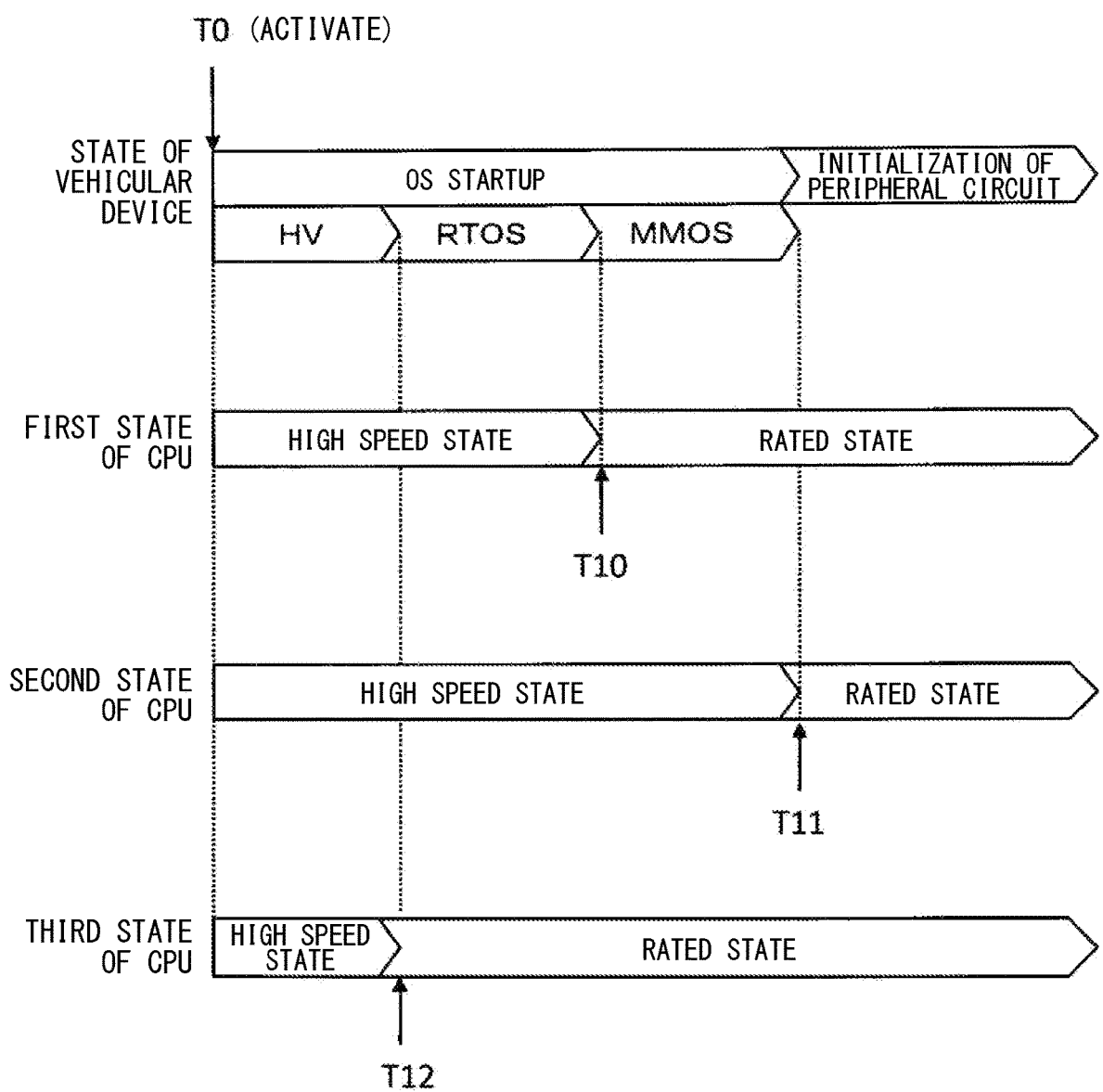
FIG. 5 is a diagram showing a state of a vehicular device and a CPU according to a second embodiment in comparison with each other.

In this case, as shown in FIG. 5 as a first state of the CPU 3, the vehicular device 1, that is, the setting unit 3*b* sets the CPU 3 to the high speed state in a predetermined period from the activation time T0 to the start time T10 of the OS 30. As described above, the OS 30 is in charge of processing the GNSS module 6, and the GNSS module 6 is used by the navigation application 40*g* of the OS 40. Therefore, when the OS 30 starts up, the CPU 3 is set to the rated state and the GNSS module 6 is set to a state not affected by noise.

In this configuration, there is no difficulty in use of the GNSS module 6 immediately after the OS 40 starts up. Thus, the configuration can inhibit malfunction and performance deterioration.

Further, as shown in FIG. 5 as a second state of the CPU 3, the vehicular device 1 sets the CPU 3 to the high speed state in a predetermined period from the activation time T0 to the start time T11 of the OS 40. As described above, the OS 40 provides radio broadcasting and television broadcasting, and it is considered that these functions are started by a user operation. Therefore, by setting the CPU 3 in the rated state when the OS 40 starts up, the radio module and the television module can be put in a state that is not affected by noise. In this configuration, there is no difficulty in use of the radio module and the television module by the user. Thus, the configuration can inhibit malfunction and performance deterioration.

Further, as shown in FIG. 5 as a third state of the CPU 3, the vehicular device 1 sets the CPU 3 to the high speed state in a predetermined period from the activation time T0 to the start time T12 of the hypervisor 20. The hypervisor 20 provides a virtual device for mediating access from the OS 30 and the OS 40. Therefore, there are peripheral circuits whose initialization is completed when the hypervisor 20 starts up. In addition, the hypervisor 20 itself may access a peripheral circuit.

Therefore, by setting the CPU 3 in the rated state when the hypervisor 20 starts up, the peripheral circuit accessed by the hypervisor 20 can be put in a state that is not affected by noise. Therefore, the configuration can inhibit malfunction and performance deterioration. When the hypervisor 20 is implemented as a part of the function of the OS 30, for example, the CPU 3 may be in the high speed state during the period until the application of the hypervisor 20 is executed, or until the functional unit that realizes the hypervisor 20 is executed.

Third Embodiment

A third embodiment will be described with reference to FIGS. 6 to 8. In the third embodiment, an example of a predetermined period different from that of the first embodiment or the second will be described. Since the configuration of the vehicular device 1 is the same as that of the first embodiment, it will be described with reference to FIGS. 1 and 2.

Figure 6:
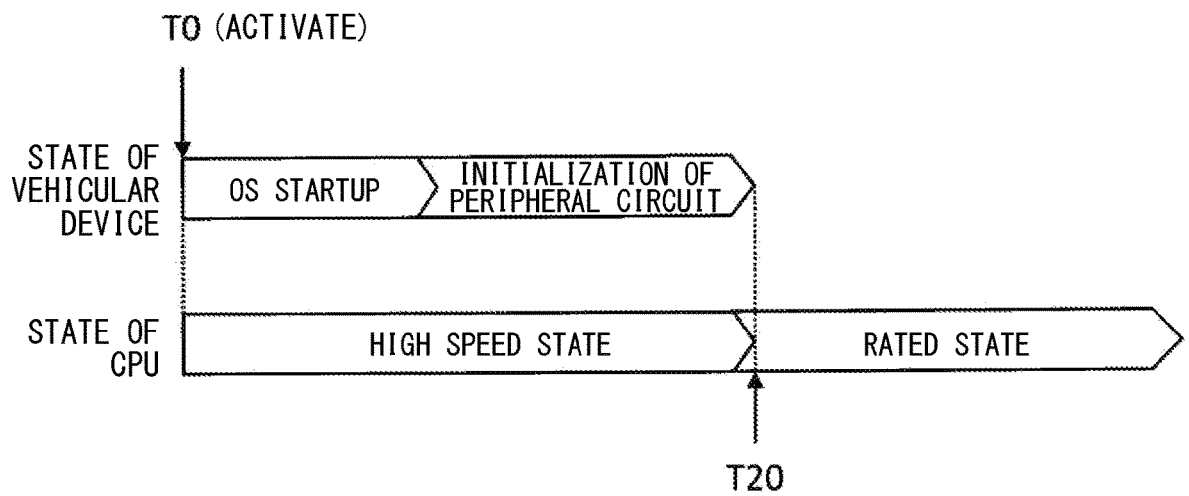
FIG. 6 is a first diagram showing a state of a vehicular device and a CPU according to a third embodiment in comparison with each other.

As shown in FIG. 6, the vehicular device 1 sets the CPU 3 to the high speed state in a predetermined period from the activation to the completion of the initialization of the peripheral circuit. As a result, the peripheral circuit used in the OS 30 and the OS 40 can be quickly initialized, and each function can be quickly executed after the OS 30 and the OS 40 are started.

Figure 7:
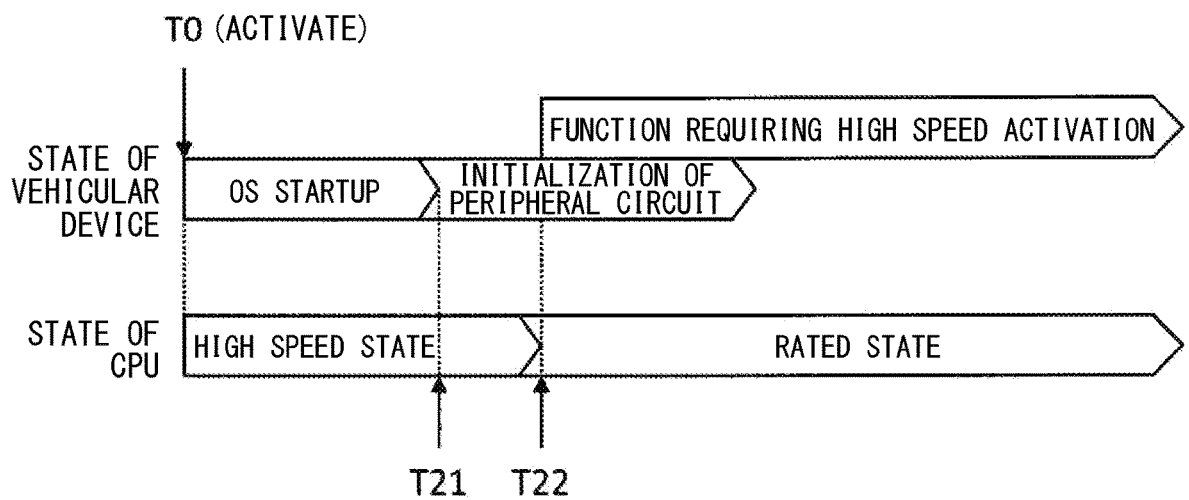
FIG. 7 is a second diagram showing a state of the vehicular device and the CPU in comparison with each other.

As shown in FIG. 7, the vehicular device 1 sets the CPU 3 to the high speed state in a period until the initialization of a specific peripheral circuit is completed. In this case, as the specific peripheral circuit, for example, a circuit used by a function that requires high speed startup can be targeted. As a result, since the CPU 3 is in the rated state when the function requiring high speed startup is executed, the configuration can inhibit the influence of noise on the function requiring high speed startup.

Figure 8:
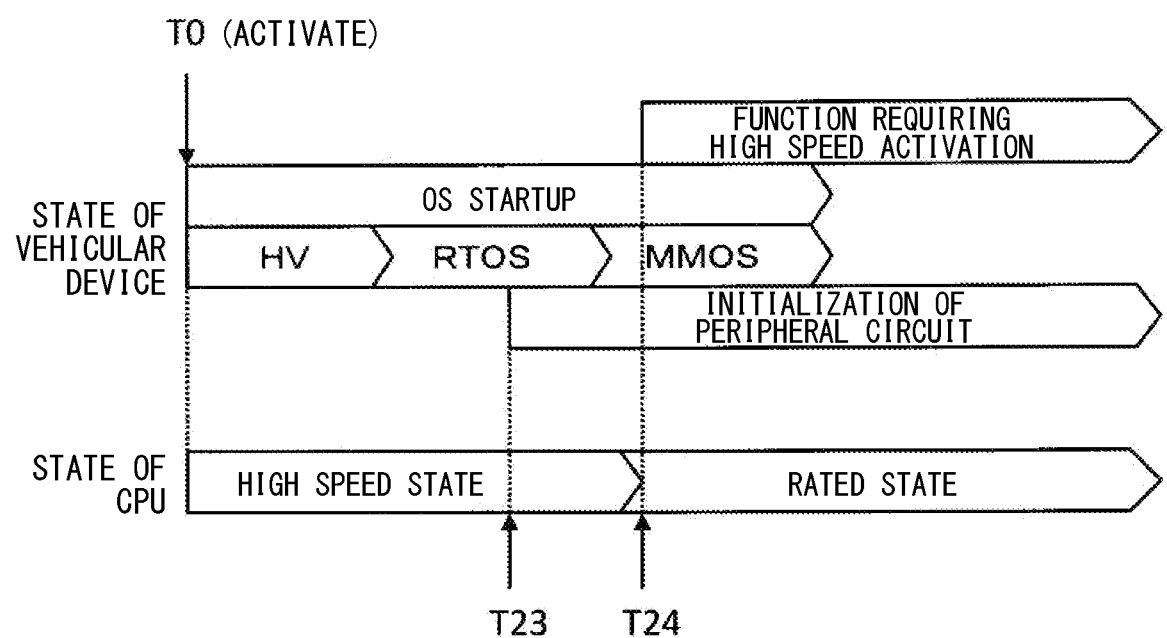
FIG. 8 is a third diagram showing a state of the vehicular device and the CPU in comparison with each other.

As shown in FIG. 8, the vehicular device 1 can set the CPU 3 to the high speed state in a period until, for example, the initialization of a specific peripheral circuit is completed on the OS 30 side during the startup of the OS. For example, the image of the rear camera 14, which is a function that requires high speed startup, can be displayed by shortcutting the CPU 3. In that case, if the initialization of the video input unit 5 and the video output unit 11 is completed, the display can be performed without waiting for the completion of the startup of the OS 30 and the OS 40. Thus, the configuration can perform a quicker display.

Although the present disclosure has been described in accordance with the examples, it is to be understood that the disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

In each embodiment, an example in which the rated clock is one is shown, but it is also possible to adopt a configuration having multiple rated clocks and switching between the clocks. In that case, since the operating clock to be switched is known, it is possible to inhibit the noise from affecting by designing the noise for each operating clock in advance.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be performed by the computer.

What is claimed is:

1. A vehicular device comprising:
   a CPU configured to be set in a rated state in which the CPU operates only at a rated operating clock and a high speed state in which the CPU automatically operates with an operating clock changing, according to a load, between the rated operating clock and a maximum allowable clock; and
   a setting unit configured to set the CPU to the rated state or the high speed state, wherein
   the high speed state is changeable in the operating clock and the rated state is not changeable in the rated operating clock, and
   the setting unit sets the CPU to the high speed state, in which the CPU exerts influence of noise, in a predetermined period from an activation, and sets the CPU to the rated state in which the CPU operates only at the rated operating clock and does not exert influence of noise, after the predetermined period elapses.

2. The vehicular device according to claim 1, wherein the setting unit sets the CPU to the high speed state in a period, as the predetermined period, from the activation until a provision of a human machine interface is started.

3. The vehicular device according to claim 1, wherein the setting unit sets the CPU to the high speed state in a period, as the predetermined period, from the activation until an execution of an application that operates on the CPU is started.

4. The vehicular device according to claim 1, further comprising
   a function unit controlled by the CPU, wherein
   the setting unit sets the CPU to the high speed state in a period, as the predetermined period, from the activation until an execution of the functional unit is started.

5. The vehicular device according to claim 1, wherein the setting unit sets the CPU to the high speed state in a period, as the predetermined period, from the activation to an operating system that operates on the CPU is started.

6. The vehicular device according to claim 1, further comprising
   a peripheral circuit connected to the CPU, wherein
   the setting unit sets the CPU to the high speed state in a period, as the predetermined period, from the activation until an initialization of the peripheral circuit is completed.

7. A vehicular device comprising:
   a CPU that has a rated state in which the CPU operates only at a rated operating clock and a high speed state in which the CPU automatically operates with an operating clock changing, according to a load, between the rated operating clock and a maximum allowable clock, wherein
   the high speed state is changeable in the operating clock and the rated state does is not changeable in the rated operating clock, and
   the CPU is set in the high speed state, in which the CPU exerts influence of noise, in a predetermined period from an activation, and set in the rated state in which the CPU operates only at the rated operating clock and does not exert influence of noise, after the predetermined period elapses.

8. The vehicular device according to claim 1, wherein the CPU exerts influence of noise in the high speed state.

9. The vehicular device according to claim 7, wherein the CPU exerts influence of noise in the high speed state.

10. The vehicular device according to claim 1, wherein the CPU exerts influence of noise in the high speed state and causes malfunction of a plurality of function units of the vehicle in a normal state after initialization thereof is completed.

11. The vehicular device according to claim 7, wherein the CPU exerts influence of noise in the high speed state and causes malfunction of a plurality of function units of the vehicle in a normal state after initialization thereof is completed.

12. The vehicular device according to claim 1, wherein noise caused by the CPU operating in the rated operation clock is restricted by noise design.

13. The vehicular device according to claim 7, wherein noise caused by the CPU operating in the rated operation clock is restricted by noise design.

* * * * *